(12) United States Patent
Katz Danan

(10) Patent No.: US 11,061,241 B1
(45) Date of Patent: Jul. 13, 2021

(54) PRODUCTION METHOD OF PSEUDO FREEFORM LENSES FOR PSP SYSTEMS

(71) Applicant: BEAM-XVISION ASI LTD., Tel Aviv (IL)

(72) Inventor: Noa Katz Danan, Irvine, CA (US)

(*) Notice: Subject to any disclaimer, the term of this patent is extended or adjusted under 35 U.S.C. 154(b) by 0 days.

(21) Appl. No.: 17/191,747

(22) Filed: Mar. 4, 2021

(51) Int. Cl.
| | | |
|---|---|---|
| B29C 33/38 | (2006.01) | |
| G02B 27/09 | (2006.01) | |
| G02B 27/00 | (2006.01) | |
| G02B 1/00 | (2006.01) | |
| B29D 11/00 | (2006.01) | |
| C03B 19/02 | (2006.01) | |
| G02B 3/02 | (2006.01) | |

(52) U.S. Cl.
CPC ...... *G02B 27/0955* (2013.01); *B29C 33/3842* (2013.01); *B29D 11/0048* (2013.01); *C03B 19/02* (2013.01); *G02B 1/00* (2013.01); *G02B 3/02* (2013.01); *G02B 27/0012* (2013.01); *G02B 27/0916* (2013.01); *G02B 27/0927* (2013.01); *B29C 2033/385* (2013.01)

(58) Field of Classification Search
CPC ........ G02B 27/0955; G02B 1/00; G02B 3/02; G02B 27/0012; G02B 27/0916; G02B 27/0927; B29C 33/3842; B29C 2033/385; B29D 11/0048; C03B 19/02; B64C 27/28; B64C 29/0033; B64C 3/26; B64C 3/32; B64C 3/34; B64D 35/04; B64D 35/06; B64D 37/04; B64D 37/06
See application file for complete search history.

(56) References Cited

U.S. PATENT DOCUMENTS

| | | | |
|---|---|---|---|
| 4,826,299 A | 5/1989 | Powell | |
| 6,787,791 B2 | 9/2004 | Karasawa | |
| 6,893,586 B2 * | 5/2005 | Yamanaka | ............. B29C 71/02 264/2.6 |
| 2002/0056817 A1 | 5/2002 | Furue | |

* cited by examiner

Primary Examiner — Joseph P Martinez
Assistant Examiner — Vipin Patel
(74) Attorney, Agent, or Firm — 1st-Tech-Ideas; Haim M. Factor

(57) ABSTRACT

A method of producing freeform lenses for a PSP laser line system having a laser line diode and a set of three freeform lenses aligned along an optical alignment axis, the set of freeform lenses configured to yield a resultant laser line, the method including: (a) calculating lens surfaces for a lens form to fabricate a lens of the lens set therefrom; (b) fabricating a plurality of slices of the lens form, the plurality of slices distributed over a width "SW" of the lens, wherein each the slices has a width dimension "SL"; (c) aligning and constraining together the plurality of slices to fabricate the lens form, and molding a lens using the fabricated lens form; (d) repeating steps (a) to (c) to produce all three lenses of the set of lenses; and (e) integrating the produced lens set into the laser line system; the resultant laser line having a length "L" and a width "W" and a power uniformity evaluated along L.

14 Claims, 7 Drawing Sheets

Detail A

PRODUCTION METHOD OF PSEUDO FREEFORM LENSES FOR PSP SYSTEMS

FIELD OF INVENTION AND BACKGROUND

Embodiments of the present invention relate to optical devices and, more particularly, to a production method of pseudo freeform lenses for PSP systems. In the specification and claims which follow, the acronym "PSP" is intended to mean "Photostimulable Phosphor" and/or "Photostimulable Plate", as known in the art.

PSP's are widely used to absorb and effectively record a latent x-ray image and to subsequently release the stored energy as light photons when the PSP is stimulated by a laser. The emitted photons are detected by a linear CMOS detector and an electronic signal is produced, which is converted to a digital image for viewing. So-called laser line generators are frequently employed to stimulate the PSP, as described above and as known in the art.

Line generators found on the market today employ cylindrical optics to expand a laser beam in one direction to create a line of light. Light lines generated by cylindrical optics are called Gaussian light lines, characterized by a bright center and lower intensity fading edges/ends—as known in the art.

A Gaussian longitudinal line intensity distribution, as described above, is problematic as the intensity distribution nearing the edge of the line eventually falls beneath the threshold levels of devices configured to detect the light—meaning the end of the light line become effectively invisible.

When used in radiation image systems using PSP plates, intensity non-uniformity of light lines can make calibration of linear CMOS detectors difficult. Separate calibrations must be made for pixels in the bright central line portion/segment and for pixels in the transitional line segments. Low intensity line portions at the ends of the light line cannot contribute to the calibration, as they are not visible to the detector device.

Relevant prior art follows includes the following.

Powell, in U.S. Pat. No. 4,826,299, whose disclosure is incorporated by reference, describes a new type of lens. The lens has the appearance of a prism with a relatively sharp radius at the apex. This lens finds an application in expanding a laser beam in one direction only.

Lenses similar to those described by Powell in the '299 patent produce an efficient flat-field line pattern (i.e., a line pattern only on a flat surface) and have addressed problems associated with Gaussian line projection of laser beams.

A flat-field line pattern affords a moderate level of uniformly distributed intensity. Powell-type lenses are frequently used as laser line generators for various applications—and for this purpose a high level of uniformly distributed light intensity is required. In general, such lenses do not provide the necessary flat-field line pattern intensity distribution because they represent an expensive way to obtain a line pattern having a near-uniform intensity distribution—as the production of Powell-type lenses requires high-precision equipment. Because such lenses employ a single surface, the lenses are difficult to manufacture with sufficiently high precision to achieve the required line quality.

Furthermore, Powell-type lenses have been limited to uses where the light source is a well-collimated diffraction-limited light beam, such as a laser beam, and this further increases the cost of such line generators. Extended light sources (i.e., having non-collimated light) are not recommended to be used with Powell-type lenses.

Karasawa, in U.S. Pat. No. 6,787,791, whose disclosure is incorporated by reference, describes a radiation image readout apparatus, which includes a stimulating light projecting system which projects a line stimulating light beam onto a stimulable phosphor sheet, a line sensor consisting of a plurality of photoelectric convertor elements which detect stimulated emission emitted from the portion exposed to the line stimulating beam and are arranged in a row, a condenser lens which is disposed along the line sensor to collect the stimulated emission on the light receiving face of the line sensor and a sub-scanning mechanism which moves one of the line sensor and the stimulable phosphor sheet relatively to each other in a sub-scanning direction. The condenser lens has a chromatic aberration of magnification in the sub-scanning direction such that most of the stimulated emission is collected on the light receiving and most of the stimulating light is collected outside the light receiving face.

Furue Ryosuke, in US Patent Application no. 20020056817, whose disclosure is incorporated by reference, describes a radiation image information recording/reading apparatus for detecting phosphorescent light from a side opposite of radiation irradiation on a stimulable phosphor sheet is downsized. The radiation image information recording/reading apparatus comprises an image recording unit for recording radiation image information on the sheet by irradiating the radiation representing image information on the sheet, an excitation light main scan means for main scan of the sheet by excitation light, photoelectric detection means for detecting the phosphorescent light emitted from the sheet, vertical scan means, and erasing means for releasing residual energy from the sheet prior to recording another image on the sheet after reading the information from the sheet. In the apparatus, the excitation light main scan means comprises a linear light source emitting the excitation light in the form of fan beams, and the photoelectric detection means comprises a line sensor.

In considering the prior art, there is a need to provide a laser line system having a more exacting specification for precisely generating line patterns (i.e., "light lines") on a PSP, namely where the light lines have a width ranging from 50-60 microns (+/−5%) and a length of substantially 440 mm (+/−1 mm) and a power uniformity along the line of +/−5%.

SUMMARY OF THE INVENTION

According to one aspect of the present invention, there is provided a method of producing pseudo freeform lenses for a PSP laser line system having an optical alignment axis, a laser line diode, and a set of three freeform lenses aligned along the optical alignment axis, the set of freeform lenses configured to yield a resultant laser line, the method including the steps of: (a) calculating lens surfaces for production of a lens form to fabricate a lens of the lens set therefrom; (b) fabricating a plurality of slices of the lens form, the plurality of slices uniformly distributed over a width "SW" of the lens, wherein each slice of the plurality of slices has a width dimension "SL"; (c) aligning, pressing, and constraining together the plurality of slices to fabricate the lens form, and subsequently molding a lens using the fabricated lens form; (d) repeating steps (a) to (c) until all three lenses of the set of lenses are produced; and (e) integrating the produced lens set into the laser line system; the resultant laser line having a length "L" and a width "W" and a power uniformity evaluated along L. Preferably, W ranges from 50-60 microns (+/−5%), L is substantially 440 mm (+/−1 mm), and the power uniformity along L is +/−5%. Most preferably, the set of three freeform lenses includes: a first lens; a second lens; and a third lens; the laser line diode has a source angular distribution aligned with the optical axis, whereby a first illumination pattern, typified by an elliptical distribution, is formed by the first lens; the second lens receives the first illumination pattern and serves to form an elongated elliptically-shaped second illumination pattern; and the third lens receives the second illumination pattern and forms the resultant laser line.

Typically, to obtain the first and second illumination patterns and the resultant laser line, the first lens is located a distance "S1" from the laser diode, the second lens is located a distance "S2" from the first lens, and the third lens is located a distance "S3" from the second lens. Most typically, freeform optics software is employed to calculate optimal lens surfaces of the set of lenses, using: W, L, the power uniformity, S1, S, and S3. Preferably, production of the lens form for respective lenses, is accomplished using a two-dimensional CNC system, the system defining the plurality of slices. Most preferably, SL values range from substantially 0.2 mm to 1.0 mm, having a tolerance of +/−0.02 mm. Typically, the plurality of slices is fabricated in hard, durable materials, chosen from the list including: aluminum and steel. Most typically, each slice of the plurality of slices has aligning holes formed therein to receive aligning pins, the aligning pins being inserted into the respective aligning holes, the aligning pins serving to constrain and align the plurality of slices, allowing them to be subsequently pressed, constrained, and maintained together as the lens form.

Preferably, an alternate lens form includes an alternate plurality of slices, including: a set of individual slices uniformly distributed over the width SW, wherein each slice of the set of individual slices has the width dimension SL; and a set of orthogonally-sliced individual slices, wherein each slice of the set of the orthogonally-sliced individual slices has the width dimension SL. Most preferably, constraining the plurality of slices uses a strong adhesive. Typically, the strong adhesive is an optical, clear adhesive. Most typically, the lens form is used to mold the set of lenses in suitable lens materials. Preferably, suitable lens materials include: BK7 glass and PMMA (Poly Methyl Methacrylate).

LIST OF DRAWINGS

The invention is described herein, by way of example only, with reference to the accompanying drawings, wherein.

Figure 2:
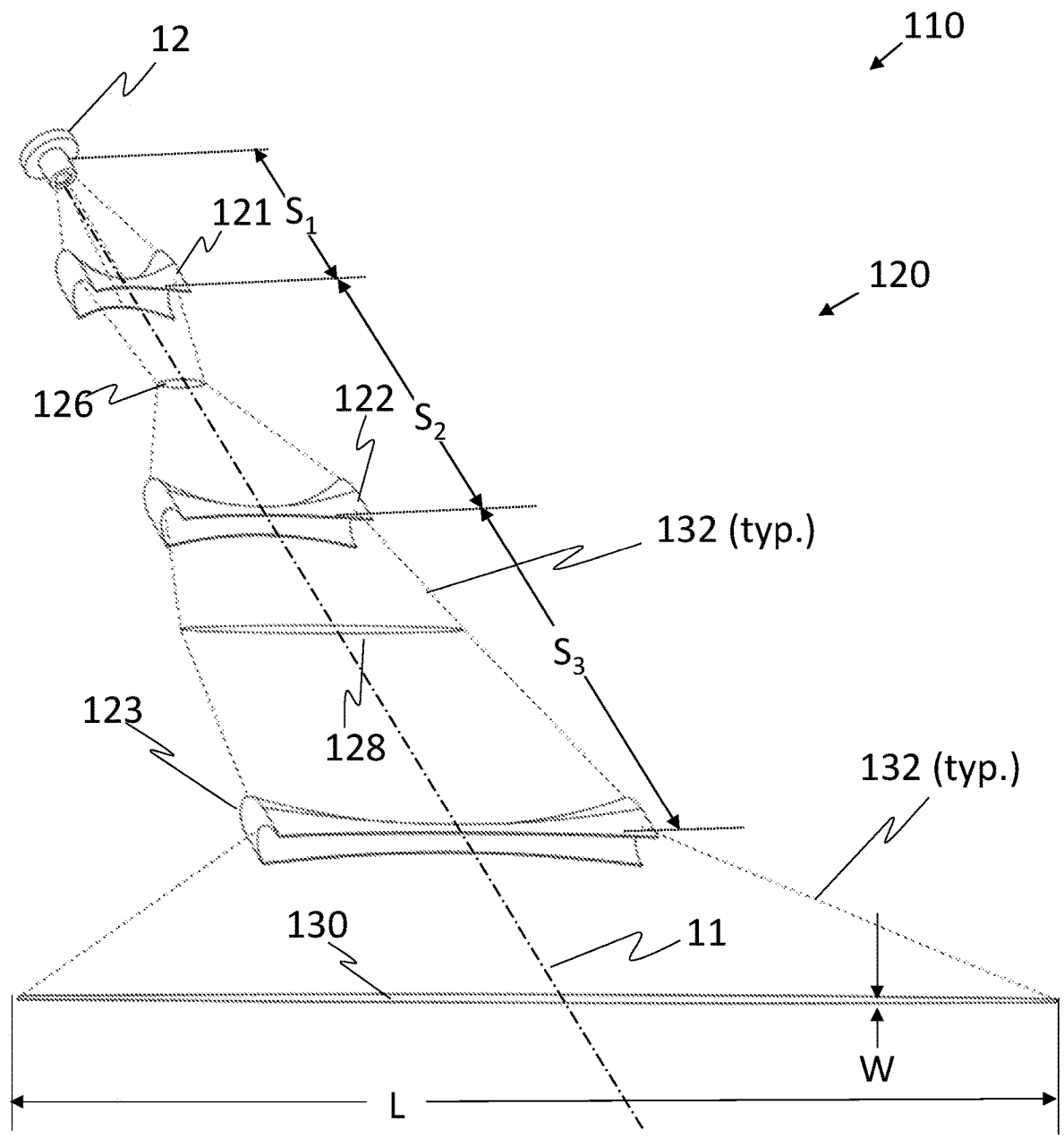
FIG. 2 is a pictorial representation of a laser line system in accordance with embodiments of the current invention.
Figure 6:
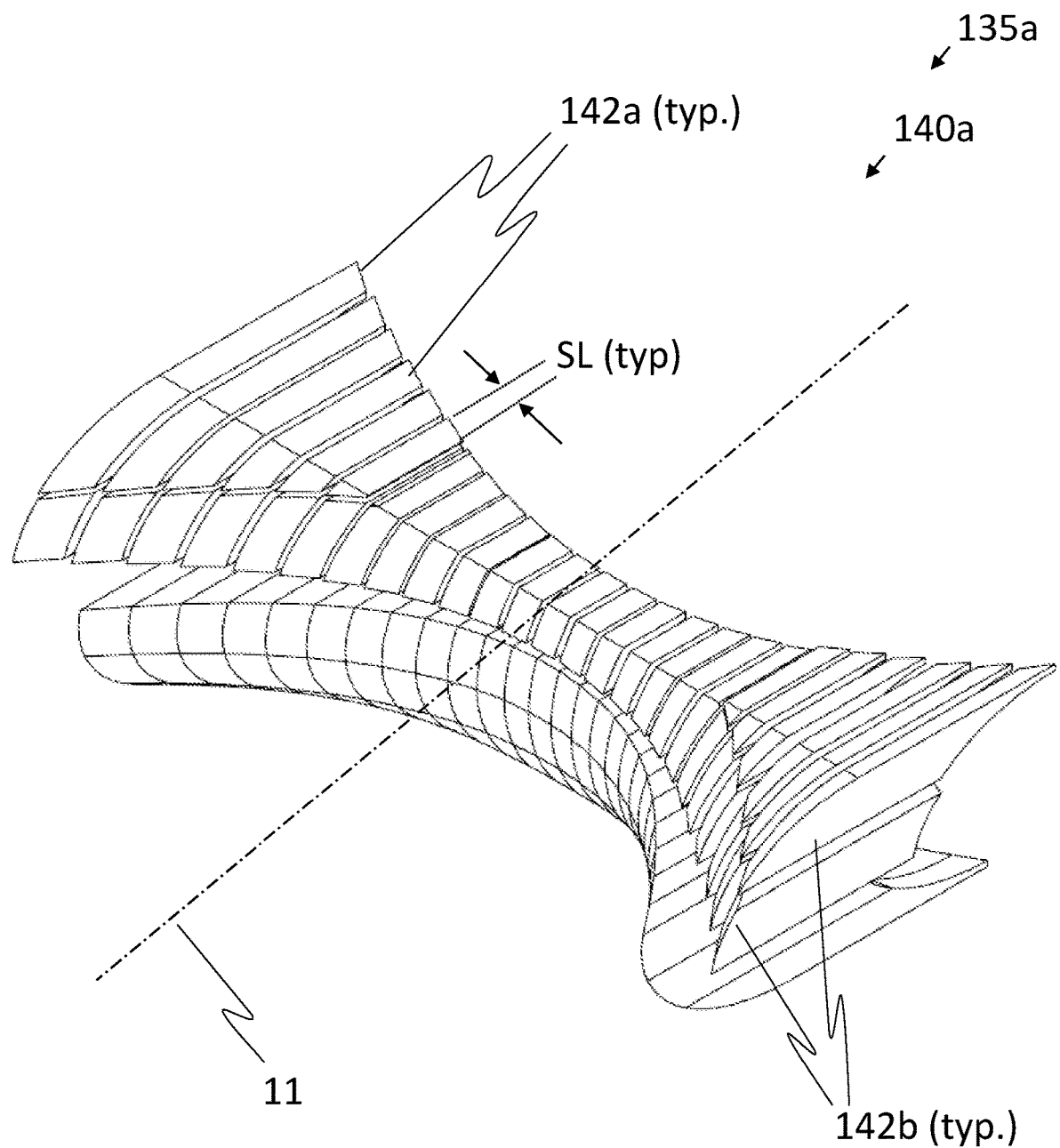
Figure 7:
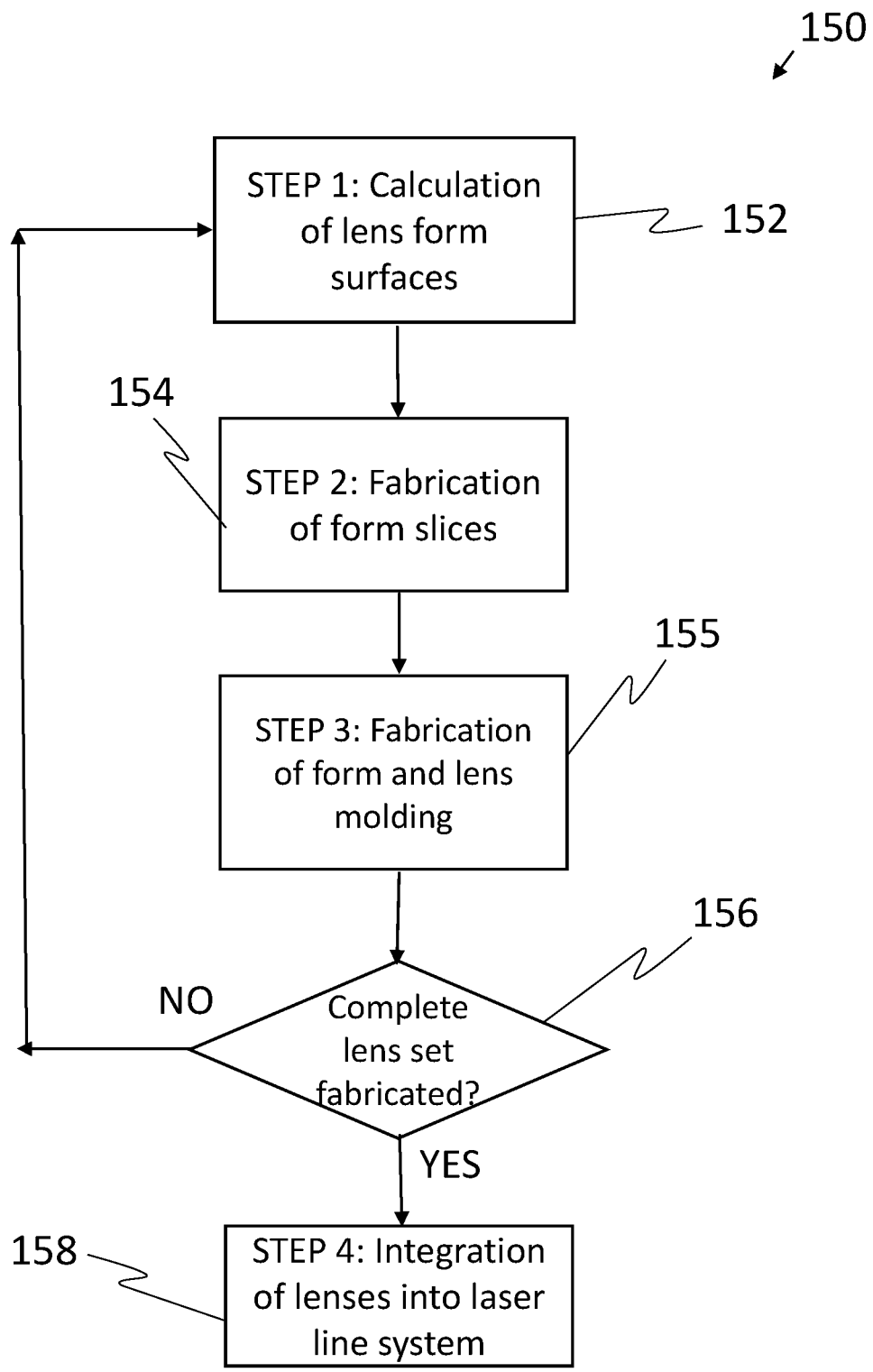

FIG. 6 is a pictorial representation of an alternate lens form of the second lens, including an alternate plurality of thin slices, in accordance with embodiments of the current invention; and FIG. 7 is a summary flow chart of the four-step method of fabricating the set of lenses of FIG. 2 and integrating them into the laser line system of FIG. 2, in accordance with embodiments of the current invention.

DETAILED DESCRIPTION

Embodiments of the present invention relate to optical devices and, more particularly, to production method of pseudo freeform lenses for PSP systems.

Figure 1:
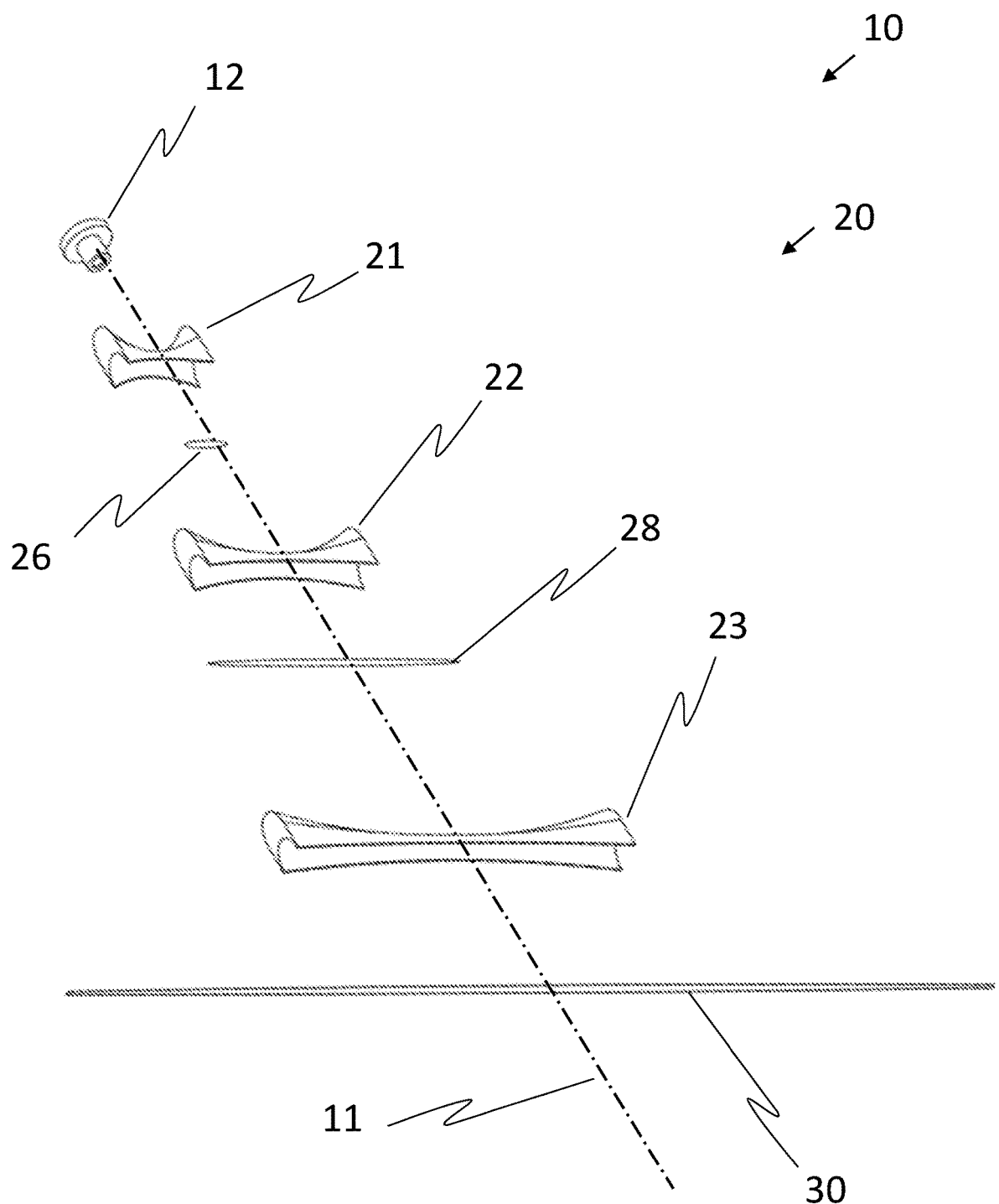
FIG. 1 is a pictorial representation of a prior art laser line system.

Reference is currently made to FIG. 1 which is a pictorial representation of a prior art laser line system 10. Prior art laser line system 10 includes: an optical alignment axis 11, along which a laser diode 12; and a set of three lenses 20: a first lens 21; a second lens 22; and a third lens 23, which are configured as shown in the figure. The lenses are configured to yield a first illumination pattern 26, a second illumination pattern 28, and a resulting illumination pattern 30 to meet system requirements, as known in the art.

As noted hereinabove, prior art systems and methods are applicable to produce the set of lenses as those shown in FIG. 1, and this is traditionally accomplished either by:

1. Utilizing off-the-shelf multiple lenses and employing a complex (and costly) integration of lenses, as the size of the laser line becomes larger than a standard market design; or
2. Employing freeform lenses—similar to those of embodiments of the current invention—but typically utilizing complicated and expensive 5-axes machines for lens production, including complex robotic polishing systems—yielding a complex and expensive production method.

Embodiments of the current invention include a practical and low-cost method that addresses shortcomings of the two prior art methods noted hereinabove. Embodiments of the current invention employ a novel process for producing the set of three lenses using a simpler, conventional two-dimensional CNC system, yielding a process which is substantially less expensive, and which allows fabrication of the lenses with high precision in a significantly shorter time, as described hereinbelow in three steps.

Reference is currently made to FIG. 2 which is a pictorial representation of a laser line system 110 in accordance with embodiments of the current invention. Apart from differences described below, laser line system 110, optical alignment axis 11, and laser diode 12 of FIG. 2 are identical in notation, configuration, and functionality as described in laser line system 10 of FIG. 1 hereinabove. Laser line system 110 includes: optical alignment axis 11; laser diode 12; and a set 120 of three freeform lenses: a first lens 121; a second lens 122; and a third lens 123, configured as shown in the figure. As known in the art, freeform optics software is employed to precisely tailor lenses to a configuration thereof to yield a first illumination pattern 126, a second illumination pattern 128, and a resulting illumination pattern 130 to meet system requirements, enhance visual appeal, and improve energy uniformity, as described further hereinbelow.

In FIG. 2, optical path lines 132 are indicated from laser diode 12 through the set of three freeform lenses and to resultant illumination pattern 130, which is also referred to hereinbelow as a "laser line" and "resultant laser line". The laser line has a length "L" and a width "W" and a power uniformity, evaluated along length L. As indicated in FIG. 2, to obtain the desired illumination patterns, first lens 121 is located a distance S1 from the laser diode, second lens 122 is located a distance S2 from the first lens, and third lens 123 is located a distance S3 from the second lens.

In embodiments of the current invention, W ranges from 50-60 microns (+/−5%), L is substantially 440 mm (+/−1 mm) and the power uniformity along L is +/−5%.

A description of embodiments of the current invention, including a four-step method of fabricating the set of three freeform lenses and integrating them into the laser line system, follows hereinbelow.

Step 1—Calculation of Lens Form Surfaces

Embodiments of the current invention include a method having three-steps to fabricate pseudo free form lenses, as described above, and a fourth step to integrate the fabricated lenses into the laser line system.

In Step 1, the method includes implementation of mathematical and CAD representation of surfaces, processed by inexpensive 2D systems in a relatively short time. An optical design software is used to calculate optimal lens surfaces for production of, firstly, a form, and subsequently to fabricate the lenses using the form—all as described hereinbelow. In the specification and claims with follow, the expression "form" is intended to mean a mold, as known in the art, from which a lens is cast/fabricated—in the present case, the lens set of FIG. 2.

Referring again to FIG. 2, calculation of a shape of the first lens and subsequent fabrication thereof is based on a mapping of a laser diode source angular distribution to first illumination pattern 126, typified by an elliptical distribution—as shown in the figures. Likewise, second lens 122 is fabricated to receive elliptical first illumination pattern 126 and to form an elongated elliptically-shaped second illumination pattern 128, as shown in the figure. Third lens 123 is calculated and fabricated to receive the second illumination pattern and to form illumination pattern 130, having the characteristics noted hereinabove.

Step 2

Figure 3:
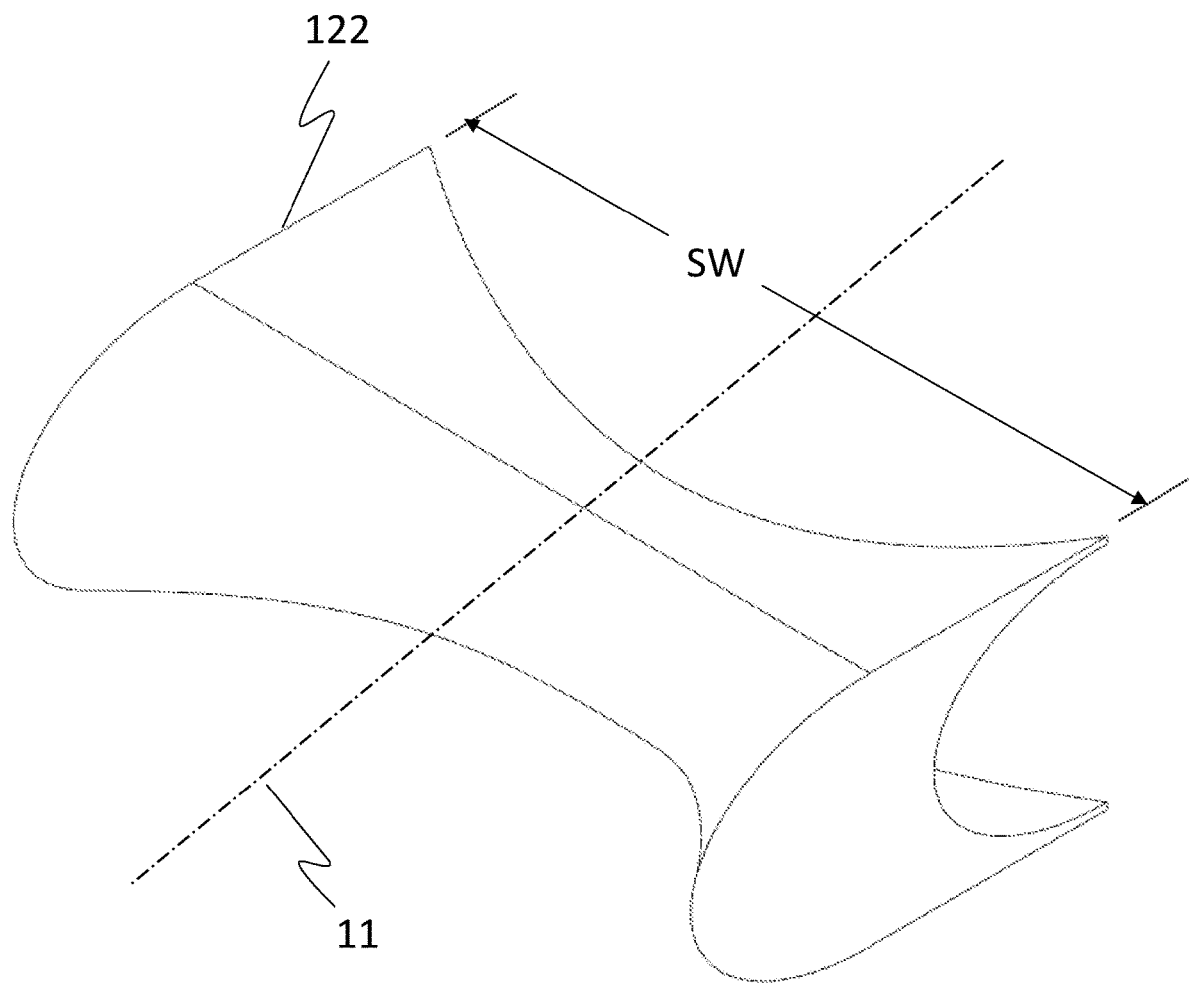
FIG. 3 is an exemplary pictorial representation of the second lens of FIG. 2, having a width SW, in accordance with embodiments of the current invention.

Reference is currently made to FIG. 3, which is an exemplary pictorial representation of second lens 122 of FIG. 2, the second lens having a width SW, in accordance with embodiments of the current invention. While the process described hereinabove and below relates to second lens 122, it is to be understood that the process is applicable to the set of three freeform lenses, including first lens 121, second lens 122, and third lens 123, as shown in FIG. 2.

In step 2 of the referenced process, a lens form is first fabricated, from which the lens is subsequently fabricated. The mathematical and CAD expressions of surfaces of the respective lenses are defined as a plurality of slices, as described hereinbelow, based on the considerations discussed hereinabove and as shown in FIG. 2.

Figure 4:
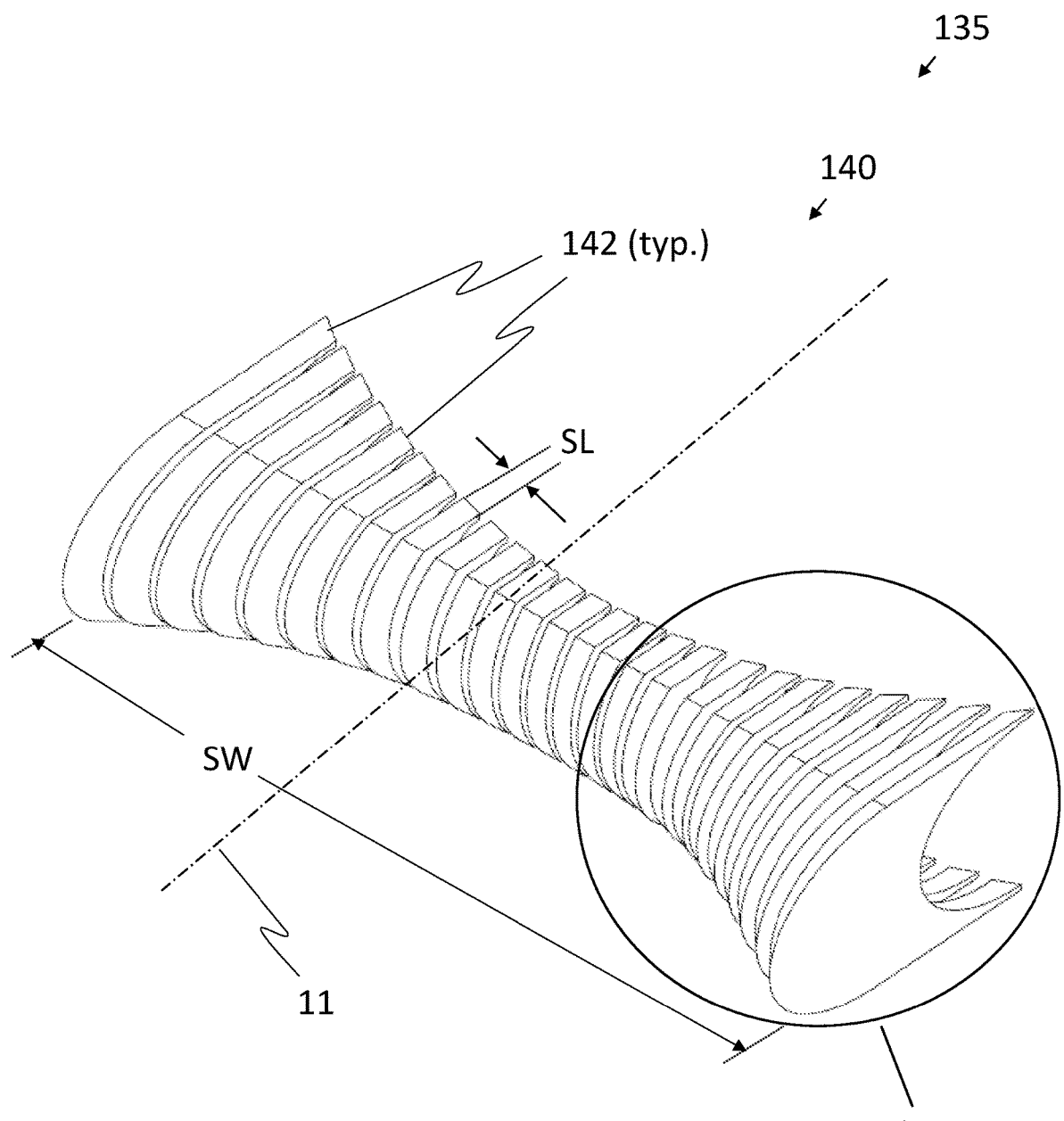
FIG. 4 is a pictorial representation of a lens form of the second lens, including a plurality of thin slices, in accordance with embodiments of the current invention.

Reference is currently made to FIG. 4, which is a pictorial representation of a lens form 135 of second lens 122, including a plurality of thin slices 140, in accordance with embodiments of the current invention. Plurality of thin slices 140 is uniformly distributed over the entire lens form width SW; with individual slices 142 having a width dimension SL, as shown in the figure. It is to be understood that the number of slices included in lens form width SW is inversely proportional to the slice width SL. While maximizing the number of slices (i.e., minimizing dimension SL) is preferable to fabricate the most precise lens form, there is a practical limit on SL. It has been found that SL values ranging from substantially 0.2 mm to 1.0 mm and having a tolerance of +/−0.02 mm is optimal for lens form 135.

Figure 5:
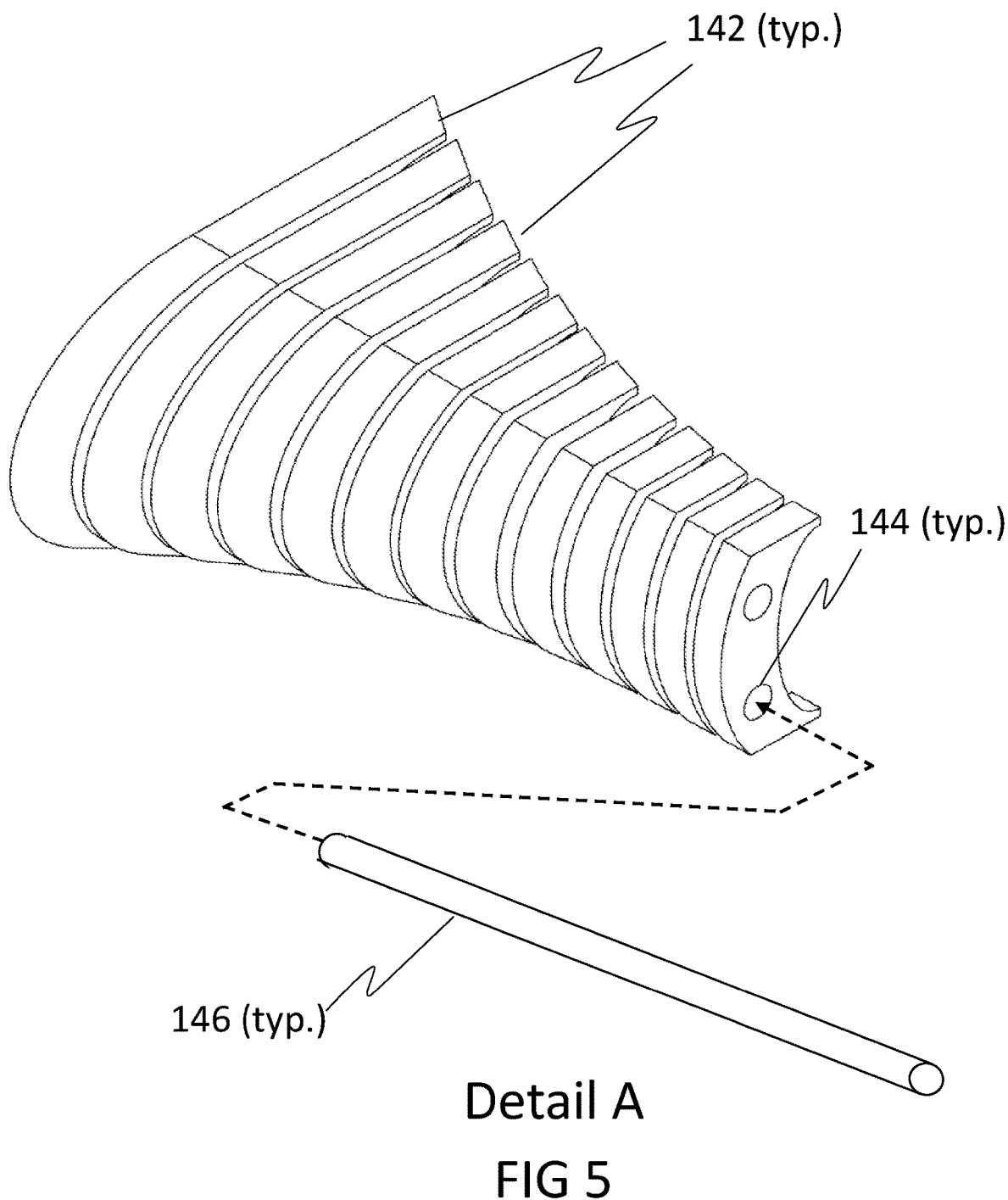
FIG. 5 is a detailed pictorial representation of an exemplary part of the plurality of thin slices of FIG. 4, in accordance with embodiments of the current invention.

Reference is currently made to FIG. 5, which is a detailed pictorial representation of an exemplary part of plurality of thin slices 140 of FIG. 4, in accordance with embodiments of the current invention. The plurality of thin slices, fabricated typically in hard, durable materials such as, but not limited to aluminum or steel, is produced by a CAD production system, as noted hereinabove and as known in the art. Each individual slice 142 has aligning holes 144 formed therein to receive alignment pins 146, the alignment pins being inserted into the respective aligning holes, as shown in the figure. (In the referenced figure, two alignment holes are shown, to receive two alignment pins—however embodiments of the current invention include more or less corresponding alignment holes and pins.) The alignment pins serve constrain/align the thin slices, allowing them to be subsequently pressed, constrained, and maintained together as form 135, in preparation for step 3, as described hereinbelow.

Reference is currently made to FIG. 6, which is a pictorial representation of an alternate lens form 135a of second lens 122, including an alternate plurality of thin slices 140a, in accordance with embodiments of the current invention. Alternate lens form 135a is fabricated in similar fashion as lens form 135 of FIG. 4, however in the current configuration, the alternate plurality of thin slices includes a set of individual slices 142a and a set of orthogonally-sliced individual slices 142b—all having a width SL, as shown in the figure. The two slice sets of alternate lens form 135a yield more pieces/slices than in lens form 135 of FIG. 4. Alternate lens form 135a allows for a more precise lens curvature to be formed, although assembling the lens form is more complex as compared to lens form 135.

Alignment and pressing together of alternate plurality of thin slices 140a may be affected using a similar hole-and-pin configuration as used in lens form 135 of FIG. 4, described hereinabove. An optional or alternative method is to align, press, and constrain the alternate plurality of thin slices using a strong adhesive, such as, but not limited to optical clear polymer adhesives, an example of which is Master-Bond EP30LV-1. Similarly, lens form 135 of FIG. 4 may also be constrained using the strong adhesive.

Step 3

The constrained, slice-metallic assembly of lens form 135 (or alternate lens form 135a) fabricated in step 2 hereinabove serves to produce/to form/to mold the set of lenses in BK7 glass or PMMA (Poly Methyl Methacrylate), among other suitable lens materials, according to the lens configurations shown in FIGS. 2 and 3. All three lenses have similar shapes created by freeform design, toroid-like surfaces, as defined by the freeform software described hereinabove and all three lenses are formed, as described hereinbelow.

Forming/molding of the lenses is affected, as known in the art, according to polymer optics processing techniques and conventional molding design rules, applying fundamentals such as, but not limited to Taguchi Design of Experiment (DOE), window processing, and decoupled (scientific) molding. Optical/mechanical molding and bonding take advantage of conventional production processes. Optical adhesives such as, but not limited to those by Norland and Loctite may be used where necessary to aid in standard and UV cure alignment of multiple optical elements.

Step 4

Once fabrication of each of the respective lenses is complete (i.e., the complete lens set is fabricated) the lens set is configured into the laser line system of FIG. 2 to yield the respective illumination patterns described hereinabove.

Reference is currently made to FIG. 7, which is a summary flow chart 150 of the four-step method of fabricating the set of lenses of FIG. 2 and integrating them into the laser line system of FIG. 2, in accordance with embodiments of the current invention.

In STEP1 152, calculation of lens form surfaces, an optical design software is used to calculate optimal lens surfaces for production of respective forms, from which respective lenses are cast/fabricated. As noted previously, calculation of the lens surfaces and shapes of the first lens and subsequent fabrication thereof is based on mapping the laser diode source angular distribution to the first, second, and resulting illumination patterns noted hereinabove.

In STEP 2 154, fabrication of form slices, the lens form is fabricated typically in aluminum or steel. The mathematical and CAD expressions of surfaces of the lens form are defined as a plurality of slices as described hereinabove in FIGS. 4-6. The plurality of thin slices is uniformly distributed over the entire lens width SW; with the individual slices having a width dimension SL. While maximizing the number of slices (i.e., minimizing dimension SL) is preferable to fabricate the most precise form, there is a practical limit on SL. It has been found that SL values ranging from substantially 0.2 mm to 1.0 mm and having a tolerance of +/−0.02 mm is optimal for fabricating the lens form.

In STEP3 155, fabrication of form and lens molding, the plurality of thins slices are aligned, pressed, and maintained together to create a complete lens form. Aligning and pressing together of the plurality of thin slices is affected using a hole-and-pin configuration as described above and as shown in FIG. 4, or the plurality of thin slices are aligned, pressed, and maintained together using a strong adhesive, such as, but not limited to optical clear polymer adhesives.

The constrained, slice-metallic assembly of the lens form fabricated in STEP 2 hereinabove serves to mold respective lenses in the set of lenses in BK7 glass or PMMA (Poly Methyl Methacrylate), among other suitable lens materials, according to the lens configurations shown in FIG. 2 hereinabove.

Once STEP 3 is completed, a check is made for completion of the set of lenses in "Complete lens set fabricated?" 156. If "NO", control is return to STEP 1 152 and another lens form and lens are fabricated. If "YES" the complete lens is fabricated and control proceeds to STEP 4.

In STEP 4 158—following fabrication of the complete set of lenses—the lens set is integrated into the laser line system of FIG. 2 to yield the respective illumination patterns and resultant laser line, as described hereinabove.

It will be appreciated that the above descriptions are intended only to serve as examples, and that many other embodiments are possible within the scope of the present invention and as defined in the appended claims.

The invention claimed is:

1. A method of producing pseudo freeform lenses for a PSP laser line system having an optical alignment axis, a laser line diode, and a set of three freeform lenses aligned along the optical alignment axis, the set of freeform lenses configured to yield a resultant laser line, the method including the steps of:
    (a) calculating optimal lens surfaces for production of a lens form to fabricate a lens of the lens set therefrom;
    (b) fabricating a plurality of slices of the lens form, the plurality of slices uniformly distributed over a width "SW" of the lens, wherein each slice of the plurality of slices has a width dimension "SL";
    (c) aligning, pressing, and constraining together the plurality of slices to fabricate the lens form, and subsequently molding a lens using the fabricated lens form;
    (d) repeating steps (a) to (c) until all three lenses of the set of lenses are produced; and
    (e) integrating the produced lens set into the laser line system;
    whereby the resultant laser line has a length "L", a width "W", and a power uniformity evaluated along L.

2. The method according to claim 1, whereby W ranges from 50-60 microns (+/−5%), L is substantially 440 mm (+/−1 mm), and the power uniformity along L is +/−5%.

3. The method according to claim 2, whereby the set of three freeform lenses includes: a first lens; a second lens; and a third lens; the laser line diode has a source angular distribution aligned with the optical axis, whereby a first illumination pattern, typified by an elliptical distribution, is formed by the first lens; the second lens receives the first illumination pattern and serves to form an elongated elliptically-shaped second illumination pattern; and the third lens receives the second illumination pattern and forms the resultant laser line.

4. The method of claim 3, whereby to obtain the first and second illumination patterns and the resultant laser line, the first lens is located a distance "S1" from the laser diode, the second lens is located a distance "S2" from the first lens, and the third lens is located a distance "S3" from the second lens.

5. The method according to claim 4, whereby freeform optics software is employed to calculate optimal lens surfaces of the set of lenses, using: W, L, the power uniformity, S1, S, and S3.

6. The method according to claim 5, whereby production of the lens form for respective lenses, is accomplished using a two-dimensional CNC system, the system defining the plurality of slices.

7. The method according to claim 6, whereby SL values range from substantially 0.2 mm to 1.0 mm, having a tolerance of +/−0.02 mm.

8. The method according to claim 7, whereby the plurality of slices is fabricated in hard, durable materials, chosen from the list including: aluminum and steel.

9. The method according to claim 8, whereby each slice of the plurality of slices has aligning holes formed therein to receive alignment pins, the alignment pins being inserted into the respective aligning holes, the alignment pins serving to constrain and align the plurality of slices, allowing them to be subsequently pressed, constrained, and maintained together as the lens form.

10. The method according to claim 9, whereby an alternate lens form includes an alternate plurality of slices, including: a set of individual slices uniformly distributed over the width SW, wherein each slice of the set of individual slices has the width dimension SL; and a set of orthogonally-sliced individual slices, wherein each slice of the set of the orthogonally-sliced individual slices has the width dimension SL.

11. The method according to claim 10, whereby constraining the plurality of slices uses a strong adhesive.

12. The method according to claim 11, whereby the strong adhesive is an optical, clear adhesive.

13. The method according to claim 11, whereby the lens form is used to mold the set of lenses in suitable lens materials.

14. The method according to claim 13, where suitable lens materials include: BK7 glass and PMMA (Poly Methyl Methacrylate).

* * * * *